April 22, 1958  C. E. BATES  2,831,910
STORAGE BATTERY
Filed Aug. 23, 1954  2 Sheets-Sheet 1
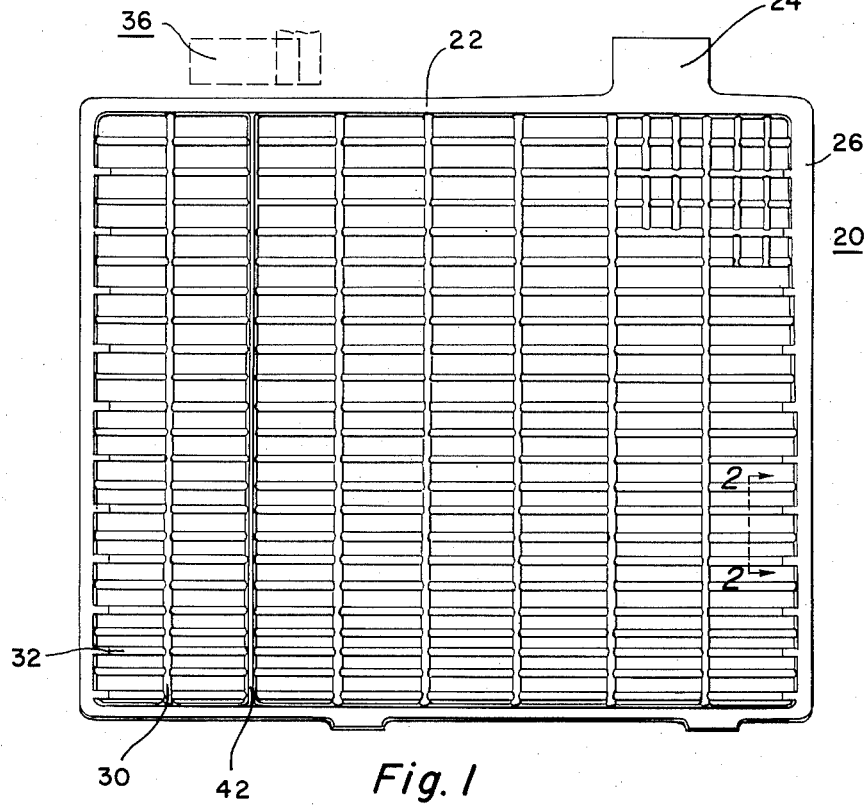
Fig. 1
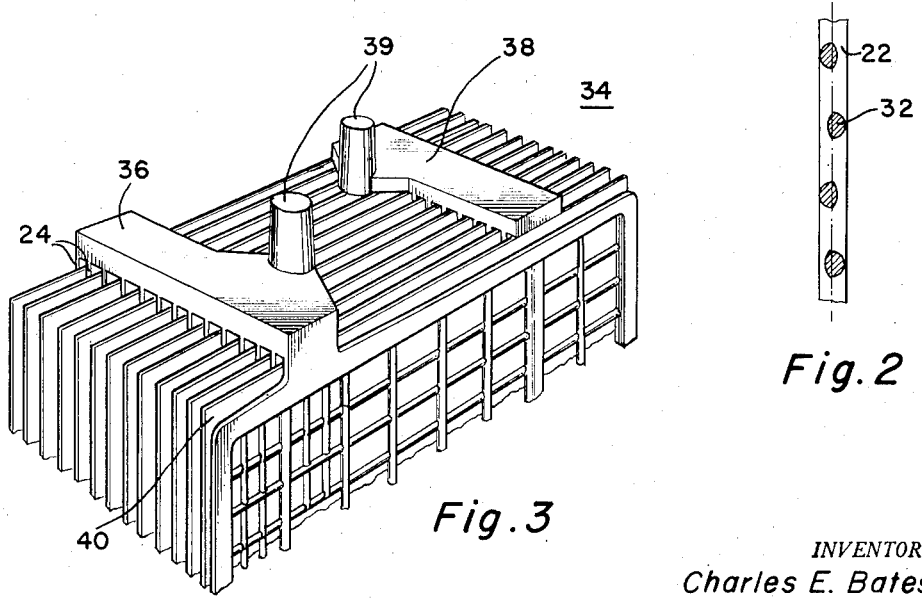
Fig. 3
Fig. 2
INVENTOR.
Charles E. Bates
His Attorney April 22, 1958 C. E. BATES 2,831,910
STORAGE BATTERY
Filed Aug. 23, 1954 2 Sheets-Sheet 2
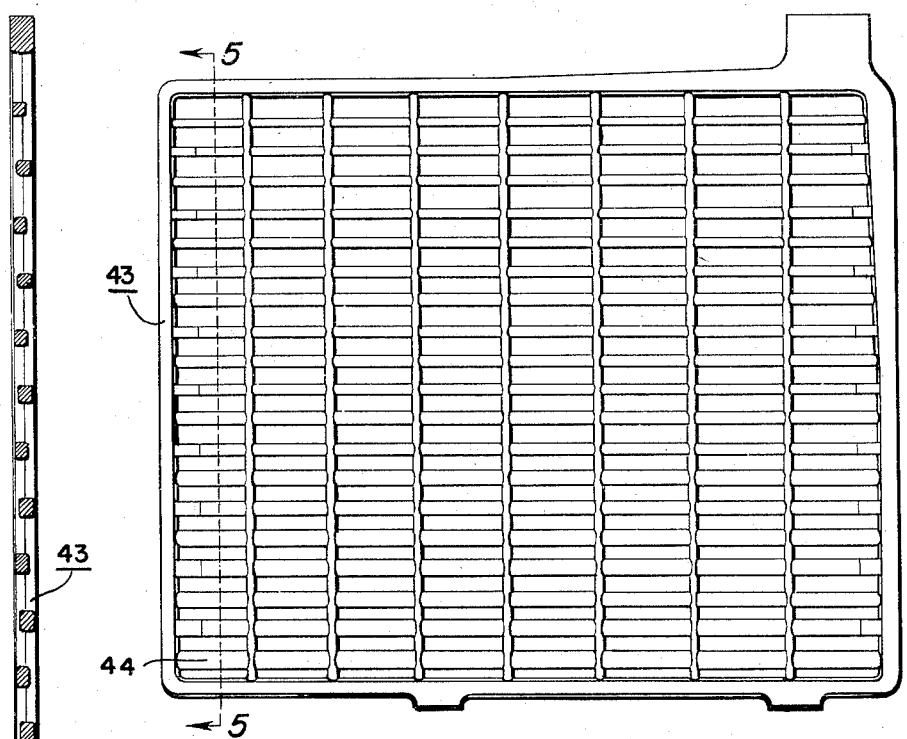
Fig. 4
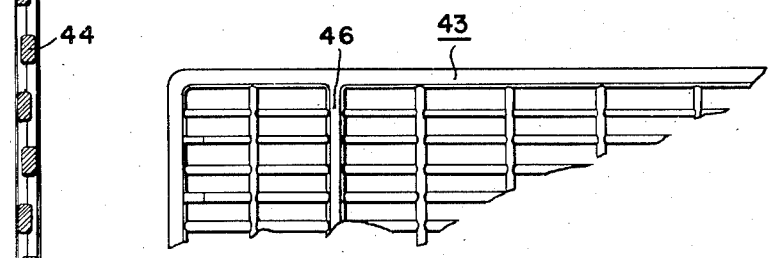
Fig. 6
Fig. 5
INVENTOR.
Charles E. Bates
His Attorney

United States Patent Office 2,831,910
Patented Apr. 22, 1958

2,831,910

STORAGE BATTERY

Charles E. Bates, Muncie, Ind., assignor to General Motors Corporation, Detroit, Mich., a corporation of Delaware Application August 23, 1954, Serial No. 451,531

4 Claims. (Cl. 136—39)

This invention relates to storage batteries and is particularly concerned with storage battery grids and grid assemblies.

It is the main object of the invention to provide an improved storage battery grid and grid assembly whereby distortion of the grid due to growth is prevented by the specific construction thereof so that in assemblies utilizing the grid, the possibility of shorting out of the grid against the connector straps is prevented.

Another object of the invention is to provide a grid wherein the amount of lead or lead alloy is progressively greater in proportion to the distance from the electrical connector portion of the grid. That is to say, the horizontal cross wires of the grid are spaced progressively closer together from the top to the bottom of the grid or the thickness of the wires is progressively greater than the top to the bottom of the grid while the center line spacing of the wire remains constant.

A still further object of the invention is to stagger the horizontal cross wires so that alternate grid wires are tangent with the plane of the outermost portion of the frame at opposite sides of the grid.

A still further object of the invention is to provide a grid wherein a heavy reinforcing vertical grid wire is provided in a position substantially beneath the position of the battery connector strap of opposite polarity when the grid is embodied in a cell assembly group whereby the grid is strengthened at this point to prevent distortion and growth of the grid and possible shorting out of the grid against the connector strap of opposite polarity.

Further objects and advantages of the present invention will be apparent from the following description, reference being had to the accompanying drawings, wherein preferred embodiments of the present invention are clearly shown.

In the drawings:

Fig. 1 shows a plan view of one type of battery grid embodying features of the present invention wherein the battery strap of opposite polarity is shown in dotted lines.

Fig. 2 is a section taken on line 2—2 of Fig. 1.

Fig. 3 is a fragmentary perspective view of a cell group showing how alternate grids are connected to battery strap connectors of opposite polarity.

Fig. 4 is a plan view of a modified construction of the grid.

Fig. 5 is a section taken on line 5—5 of Fig. 4, showing the increasing cross section of the grid wires wherein the spacing is maintained uniform.

Fig. 6 is a fragmentary plan view of the grid shown in Fig. 4 wherein a heavy vertical reinforcing wire is utilized for reasons similar to the use of heavy wire shown in Fig. 1.

Present-day storage battery designs utilize relatively light grids onto which is pasted the active material for the positive and negative plates. These grids are formed from cast lead and in view of the reduced weight thereof over old style grids, are less expensive to manufacture, easier to paste, less bulky and more adaptable for use in present-day production wherein the overall size of the battery is of importance because of limited space available in many applications thereof.

The reduction in the quantity of lead used in the grids while yielding improved results both economically and operationally, creates another problem which heretofore has been unsolved. This problem resides in the tendency of the lighter grid to sometimes distort in use due to growth of the active material carried thereby which distortion causes the grid in some cases to short out against adjacent terminal of opposite polarity within the cell group. This invention is directed specifically to a means for preventing undesirable distortion of the grid and relates to a means of improving electrical characteristics of the grid through distribution of the lead compound used therein.

Referring specifically to the drawings, an improved grid is shown at 20 which grid includes a frame member 22 having a connector tab 24 cast thereon. The frame member 22 is preferably of heavier cross section than the remainder of the grid and is preferably tapered from top to bottom as noted at 26 to help support the weight of the grid with respect to the connector tab 24. Within the confines of the border 22 are spaced a plurality of integrally cast vertically extending grid wires 30 and a plurality of integrally cast horizontally extending grid wires 32. The horizontal wires 32 preferably have a cross section as shown in Figure 2 and are staggered on either side of the center line as noted. This aids in holding the active material, which is later pasted on to the grid, in firm contact therewith.

In a cell unit as shown at 34 in Figure 3 a plurality of grids are utilized wherein the connector tabs on alternate grids is reversed in position and wherein alternate grids are processed so as to present positive and negative plates for the cell. All of the tabs 24 of one polarity are welded to a connector strap shown at 36 while all of the grids of the opposite polarity have their connector tabs 24 soldered to a second strap shown at 38. Each strap 36 and 38 includes a terminal 39 thereon which protrudes through the cell cover (not shown) when the battery is fully assembled. Between the grids of different polarity are interposed separators 40 formed from micro-porous rubber, wood, treated paper, etc., which separators act as permeable insulators.

The problem heretofore mentioned of distortion of the grid arises through the fact that the grid 20 as shown in Figure 1, for example, is connected to a strap 38 as noted in Fig. 3 through its connector tab 24. In a cell group 34, the opposite polarity strap 36 is in a position indicated in dotted lines in Figure 1. This position is at a point where the grid will distort the greatest amount since it is spaced a substantial distance from the connector tab 24 and is unsupported except for the bottom thereof which rests on rails in the bottom of the cell container (not shown). Thus, as the grid 20 distorts due to the growth of active material the portion immediately under the strap 36 moves upwardly and in some cases contacts the strap 36 which shorts out the plate and the cell. When grids become shorted out, the battery is rapidly deteriorated to a point of failure.

For this reason, it is desirable to provide for preventing this growth of the grid and this means is embodied in a vertical grid wire 42 of heavier cross section than any of the other vertical grid wires. The wire 42 is positioned on the grid at a point where it will fall substantially beneath the connector strip of opposite polarity when the grids are assembled in a cell group. Thus, in the group shown in Figure 3 every grid beneath the connector strips 36 or 38 which is not electrically connected thereto includes the heavier vertical grid wire 42 in a position directly beneath the connector strap of opposite polarity.

I have found that this design of the grid substantially prevents distortion at the point where the distortion of the grid is the most prevalent. Growth of the grid at other portions thereof is of little moment and therefore only one reinforcing grid wire is necessary. This permits the continued use of a relatively light grid with a minimum of lead alloy therein.

The heavy wire 42 may be oval in shape so that its inner dimension is the same as other wires in the grid or it may be of overall greater dimensions as limited only by the thickness of the border. In other words, the wire 42 should never be of greater thickness than the border of the grid.

Another feature of the invention resides in the spacing of horizontal grid wires 32. This spacing is desirable since it provides more electrical paths and lower resistance in the grid at points remote from the connector tab 24. In Figure 1 the wires are merely spaced progressively closer together toward the bottom of the grid and all wires are of the same cross section. In the modification shown in Figure 4 the grid 43 includes horizontal grid wires 44 that are spaced at the same center distance but are of increasing cross sectional area as shown in Figure 5, which is a section of the grid 43 taken on line 5—5 of Figure 4.

Figure 6 shows a modification of the grid 43 wherein a heavier vertical grid wire 46 is utilized for the same purpose that the wire 42 is utilized in connection with the grid shown at 20 in Figure 1.

From the foregoing it is apparent that I have provided means for preventing undesirable distortion of battery grids through the use of a single reinforcing wire of heavier cross section than the remainder of the vertical grid wires, which reinforcing wire is positioned in the grid at a point immediately below the position normally occupied by the battery strap connector having a polarity opposite to the polarity of the specific plate or grid. I have also provided a grid which has progressively lower resistance as the distance increases from the connector tab and this feature may be obtained either by spacing the horizontal grid wires progressively closer together or by maintaining uniform spacing of said grid wires while increasing progressively the cross sectional area thereof.

Vertical wires may also be arranged to progressively reduce resistance of the grid. This may also be accomplished by maintaining the center line spacing of the wires and progressively increasing their cross sectional area or by progressively spacing the wires closer together as the distance from the connector strap increases.

While the forms of embodiment of the invention as herein disclosed constitute preferred forms, it is to be understood that other forms might be adopted, as may come within the scope of the claims which follow.

What is claimed is as follows:

1. A cell assembly for a Faure type storage battery comprising in combination; a plurality of grids each having a connector portion adjacent one side of the top thereof, said grids being assembled in alternate relation so that the connector portion of every other grid is in oppositely disposed position to the connector portion of the grids at either side thereof, separators separating adjacent grids, two connector straps, one of which is used to connect all of the connector portions at one side of the grid assembly and the other of which is used to connect all of the connector portions at the opposite side of the grid assembly for providing two poles of opposite polarity, each of said grids having a plurality of integrally formed vertical grid wires each wire being of substantially uniform cross section wherein only the vertical grid wire disposed substantially directly beneath the connector strip of opposite polarity is of heavier uniform cross section than the remaining vertical grid wires.

2. A cell assembly for a Faure type storage battery comprising in combination; a plurality of grids of substantially the same general configuration wherein every other grid is turned end to end, each of said grids including a connector tab adjacent one end thereof so that alternate grids have their connector tabs at the same ends of the grids whereby two spaced connector strips connect all of the tabs in the cell group, each of said grids being composed of a border portion having integrally cast horizontal and vertical grid wires therein, and a single grid wire of substantially uniform cross section and heavier than any of the other vertical grid wires and vertically disposed in each grid and positioned vertically and substantially below the battery strap of opposite polarity in the cell group for strengthening the grid and resisting distortion.

3. A battery grid for subsequent use in a cell group wherein a plurality of similar grids are assembled in oppositely disposed position so that connector tabs of every other grid are in alignment comprising in combination a border having an integrally cast connector tab positioned at the top and adjacent one side thereof, a plurality of integrally cast horizontal grid wires in spaced relation within said frame, a plurality of integrally cast vertical grid wires each having a uniform cross section and positioned in spaced relation with respect to said frame, and a single vertical grid wire of heavier uniform cross sectional area than the remainder of said vertical grid wires disposed remote from said connector tab and the same distance from the frame on one side as the center of the connector tab is on the other side for strengthening the unsupported portion of said grid and for resisting distortion of the grid in a vertical direction said single heavier cross section vertical being positioned so as to be in alignment with the connector tab of the next adjacent opposite polarity grid when the said grid is assembled in the cell group.

4. The grid as claimed in claim 3 wherein the spacing of the horizontal grid wires is maintained equal and wherein the grid wires are of progressively greater cross section from top to bottom of the grid for progressively reducing the resistance of the electrical path through the grid.

References Cited in the file of this patent

UNITED STATES PATENTS

| 1,236,672 | Chamberlain | Aug. 14, 1917 |
| 1,933,928 | Perkins | Nov. 7, 1933 |
| 2,064,324 | Schnaubelt | Dec. 15, 1936 |
| 2,503,970 | Rupp | Apr. 11, 1950 |
| 2,690,464 | Harris | Sept. 28, 1954 |

FOREIGN PATENTS

| 732,404 | Great Britain | June 22 1955 |
| 892,117 | France | Mar. 29, 1944 |